United States Patent

Gunnarsson

[11] Patent Number: 5,862,222
[45] Date of Patent: Jan. 19, 1999

[54] SYSTEM AT A VEHICLE FOR DEBITING AT AUTOMATIC FUELLING

[76] Inventor: Staffan Gunnarsson, Svärdsliljevägen 62, S-165-77, Hässelby, Sweden

[21] Appl. No.: 737,802
[22] PCT Filed: May 27, 1994
[86] PCT No.: PCT/SE94/00508
§ 371 Date: Nov. 27, 1996
§ 102(e) Date: Nov. 27, 1996
[87] PCT Pub. No.: WO95/32919
PCT Pub. Date: Dec. 7, 1995
[51] Int. Cl.⁶ ........................................... H04L 9/00
[52] U.S. Cl. ................. 380/24; 340/825.35; 342/51
[58] Field of Search ............ 380/24; 340/825.33, 340/825.34, 825.35; 342/42, 51

[56] References Cited

U.S. PATENT DOCUMENTS

| | | | |
|---|---|---|---|
| 4,303,904 | 12/1981 | Chasek . | |
| 4,728,955 | 3/1988 | Hane | 342/140 |
| 5,392,049 | 2/1995 | Gunnarsson | 342/42 |
| 5,552,790 | 9/1996 | Gunnarsson | 342/42 |

FOREIGN PATENT DOCUMENTS

| | | |
|---|---|---|
| 0418744 | 3/1991 | European Pat. Off. . |
| 0476858 | 3/1992 | European Pat. Off. . |
| 9203590 | 7/1993 | Sweden . |
| 9303879 | 5/1994 | Sweden . |
| WO9315418 | 8/1993 | WIPO . |
| WO9406031 | 3/1994 | WIPO . |

*Primary Examiner*—Salvatore Cangialosi
*Attorney, Agent, or Firm*—Alfred J. Mangels

[57] ABSTRACT

System for automatic fuelling of a vehicle and debiting for fuel obtained. A transponder is provide on the vehicle for the positioning of a fuelling robot and includes coded information to be utilized for the debiting function.

24 Claims, 3 Drawing Sheets

5,862,222

SYSTEM AT A VEHICLE FOR DEBITING AT AUTOMATIC FUELLING

BACKGROUND OF THE INVENTION

1. Field of the Invention

The present invention relates to a system for debiting therefore for costs of automatic fuelling, of a vehicle where the driver does not have to leave the vehicle for paying the filled fuel.

2. Decription of the Related Art

Automatic fuelling of vehicles is known, among others from the Swedish patents 8403564-1 and 9002493-6, that show solutions where the position of the filling point of the vehicle is automatically measured by means of microwave technology, in that a fuelling robot senses the position of a position giving transponder assembled for the purpose close to the filling point of the vehicle. In this way a comfortable, safe and fast filling of fuel is obtained, without the driver having to step out of the vehicle.

Since usually a payment/debiting is related to the filling of fuel, it is also desirable to find solutions allowing that the payment operation itself does not require leaving the vehicle, since otherwise a big part of the advantages with automatic fuelling would be lost.

Hereby information about account, fuel quality etc can be stored in a transponder on the vehicle, for example in the transponder unit that is used for measuring of the filling point position. Thereby the cost for a special data carrier and reader for the debiting is avoided, since common system components are used for the position measurement as well as for the debiting.

An aim with the present invention is to enable automatic debiting during automatic fuelling of vehicles and without the driver having to step out of the vehicle, and where the total cost of the system has been minimized.

A second aim with the invention is to solve the theft demand problems for a transponder on a vehicle that may occur when using debiting functions in the transponder.

A third aim of the invention is to provide a solution that allows an accurate measurement of the position of the transponder as well as that the transponder is communicated with data.

A fourth aim of the invention is to enable an off-line function, i.e. that the system shall not have to call data central to match the data code of the transponder with a personal code related to the driver of the vehicle and/or the fuelling place.

A fifth aim of the invention is to enable also the debiting in to be carried out off-line, i e without having to call a data central.

A sixth aim of the invention is to enable updating and reading of the transponder both at the fuelling robot and at other places in a way which is acceptable from a security point of view.

SUMMARY OF THE INVENTION

The present invention thus relates to a system for debiting for carts of automatic fuelling of vehicles, where a microwave transponder close to the filling point of the vehicle is used for positioning of a fuelling robot by position measurement with a sensor in the moving arm of the robot. The transponder also is arranged to contain information concerning debiting related to the filling, and a code read by the sensor from the transponder thereby is matched with data from a registration unit for identification of the owner or the driver of the vehicle.

By owner or driver is meant in the description and the claims, in addition to the owner or the driver a person who is authorized to fuel the vehicle and thereby cause an account or the like to be debited.

According to the invention a microwave transponder (0,9–25 GHz) mounted close to the filling point of the vehicle has been designed so that it both can be carefully detected with respect to its position, and also that it can be read with respect to its data contents, and possibly also that it can be reprogrammed. A preferred embodiment of the transponder operates in that at certain times it gives away a measurement signal, and at other instants communicates with a data signal. By a thus repeated and time sequential measurement/communication a solution is obtained where the respective signals can be optimized for their purpose.

According to the invention, an active and unique action of the driver of the vehicle is required, Alternatively that a biometrical sensing of the driver is made, whereby a higher level system ties together the information from the driver with the information that has been stored/is stored in the transponder. In this way there is no longer any demand to steal the transponder, since a violator with great certainty is not able to repeat the identification of the driver, and he can thereby not make any use of a stolen transponder.

The identification of the driver is in a preferred embodiment made such that the driver keys in a PIN code (Personal Identification Number) in a keyboard close to the side window of the vehicle, but can also make use of so called biometrical methods such as speech/voice recognition, where the driver talks in a code via a microphone close to the vehicle. Other biometrical methods include that the driver enters his finger in a sensing unit for fingerprints close to the vehicle, alternatively that the shape of the palm of the hand is sensed.

In still another embodiment the driver uses a code transmitter or an electronic reflecting data carrier to transfer an identification signal. Alternatively an object belonging to the driver, such as a card with an optical code, can be used for the identification.

All the mentioned methods can be used without the driver having to step out from the vehicle, and thereby give the desired comfort.

The methods with biometry, code transmitter, data carrier and optical codes also have the advantage that a code does not have to be memorized.

In a preferred embodiment the transponder can partly or completely be written with encrypted data. In this case the advantage of protection against viewing as well as protection against copying between different transponders is obtained, whereby the theft demand for the transponder is furthermore decreased. In addition the risk for unauthorized copying is reduced, e.g.—with transponder data which with a portable reader is detected from a vehicle provided with a transponder on a parking place or the like.

Information storage in the transponder is thereby made both in a read memory and in a write/read memory, whereby the read memory is only possible to write once, preferably during manufacturing of the transponder.

The read memory is written with a code unique to each transponder, a so called mark, so that each unit is unique and can not be mixed up with others. Permanent writing methods are preferably used, e.g.—in that memory circuits in the data chip of the transponder during manufacture are etched selectively with a laser or are burned by means of coded current pulses in a pattern individual to each transponder.

During writing of encrypted data in the transponder the information is encrypted together with the individual unique mark of the transponder and possibly a random number, in that the mark first is read into the unit that makes the encryption. In this way a unique encrypted code is created in the write/read memory of each transponder, even if the information in different transponders, e.g.—the code for a certain fuel filling station, should be alike. This make it much more difficult for unauthorized viewing of the transponder and falsification of it.

Another advantage with the encryption technique is that one does not have do distribute transponder lists to the filling stations, but only the system key that has been used for writing of the data carrier with its encrypted data. By aid of the system key the distributed communication units can automatically decide if the data carrier is valid or not, e.g.—if a prepaid value stored in the transponder is large enough, if the transponder is valid at the filling place in question etc, without a central system having to be called. In this way communication costs, long response times and vulnerability of the system is avoided. Related debiting does not have to be made at the same time as the fuelling takes place, but can take place before or afterwards as desired.

Nevertheless so called black lists can be distributed at a relatively low cost to the fuel filling stations, since they only contain a minor part of all transponders in the system, and then be locally verified against the unique mark of the transponder.

To show that the transponder is used by its right owner, the security may require that a special code, so called PIN code, is used during identification. The PIN code can according to the system described herein be stored in a secure way in encrypted form in the transponder and be compared with the code that is received from the owner at an entering unit localized close to the fuelling robot. Since the PIN code is encrypted, the security will be sufficient to permit the verification to take place locally and without calling.

A PIN code, however limits the flexibility in the identification since the person has to key it in each time. It can then be imagined that a PIN code is keyed in more seldom, e.g.—once a month and at the fuelling place that is most often used. The validity period and a code for the special fuelling place is thereby written into the transponder in an encrypted way and can be valid for e.g.—a month or a year.

It will furthermore be more secure to store prepaid monetary values in the transponder, that can be debited each time fuelling takes place. The petrol station does then not have to make a call neither to check the PIN code nor to debit a central account, but can function off line. This is especially advantageous in less populated areas and in areas where the infrastructure of society is not well developed as regards handling of electronic payment transactions.

Filling of a new amount into the transponder can take place at the instant of fuelling by the fact that the position sensor also changes transponder data according to an order from a bill counting machine, a bank etc according to the driver's instructions during fuelling, and where a credit card or a so called smart card can be used to authorize the transaction.

The transponder contains in a special embodiment also a write memory that can not be read, and a fast encryption algorithm in hardware and without microprocessor. In the write memory in the transponder one then writes in a transponder key in the form of an encrypted number. The transponder key is created by the fact that, in the unit that makes the writing, the first read unique mark of the transponder is encrypted with a higher level system key.

An advantage with the solution with transponder key and hardware algorithm is that the system can ensure that nobody can imitate the behavior of the data carrier, that will become different from one communication instant to another. During identification, the communication unit sends a random number to the transponder. The transponder encrypts the random number with the transponder key according to the encryption alghorithm built in in its hardware, and retransmits the encrypted random number and the mark to the communication unit.

The communication unit can now with the mark, the system key and the random number calculate the transponder key and perform the same encryption as the data carrier to check that the response of the transponder is valid.

A special advantage by not using a microprocessor is that the encryption procedure becomes faster, especially since no time is needed to serially feed data between the high frequency junction and the circuits of the microprocessor. Since the serial circuits can operate in synchronism with the high frequency signals, the communication time is considerably reduced.

Another advantage by not having a microprocessor in the transponder is that it can be made much more lean on current, which gives smaller dimensions and lower cost at the same time as both speed and communication range will be good.

A portable read/write unit can be used to update the data of the transponder. The portable unit can thereby stay in connection with a data center via microwaves within a range of about hundred meters.

Data intended for the transponder can comfortably and without wire be gathered from the data center to the place where the vehicle is parked, and in the opposite way transponder data can be transferred from the transponder to the data center. Since the encryption key thereby does not exist in the portable unit but is in a higher level system, the theft demand for the portable unit will be low. It can not be used in itself to read and interpret transponder data, but serves as a convenient communication link for transponder data to and from each place within reach of the communication unit from the data center.

The portable unit can also, instead of via microwave communication, be connected to the data center via a cable.

BRIEF DESCRIPTION OF THE DRAWINGS

The invention shall now be described in greater detail with reference to embodiments of the invention shown in the enclosed drawings, where.

DESCRIPTION OF THE PREFERRED EMBODIMENTS

Figure 1:
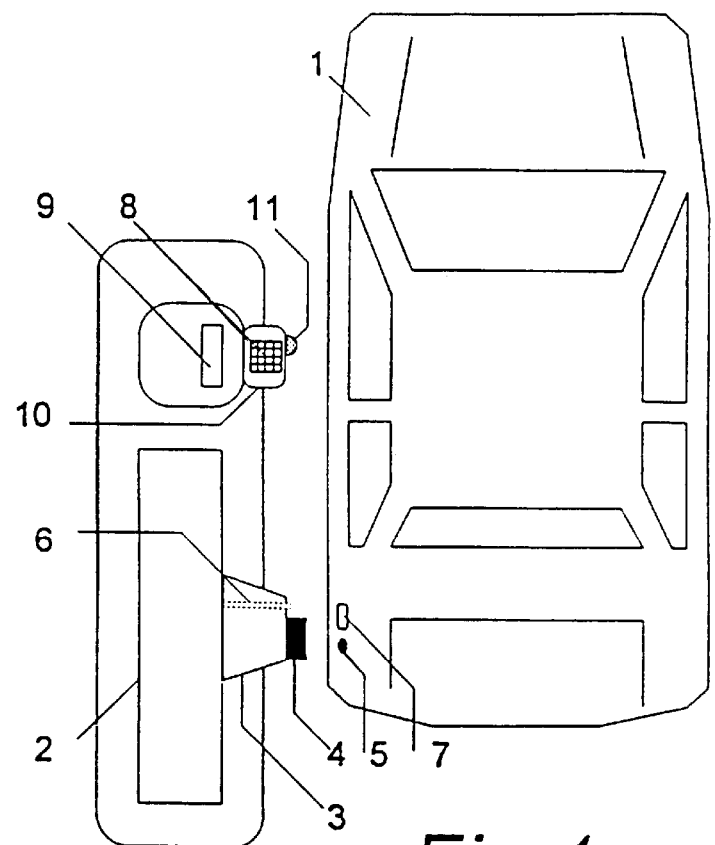
FIG. 1 shows a top diagrammatic view of a vehicle at an automatic fuel filling station.

FIG. 1 shows a vehicle 1 close to an automatic fuelling robot 2. The robot has in the outer end of its movable arm 3 a sensor 4, which is designed to measure the position of a transponder 5, so that with guidance of the transponder 5 is able to guide its filling tube 6 to the filling place 7 of the vehicle.

Close to the vehicle 1 there is a sensor unit 10, which senses the result of a unique action by the driver, or biometry, such as the keying in of a PIN code, voice expressions, fingerprints, hand palm pattern etc.

Figure 2:
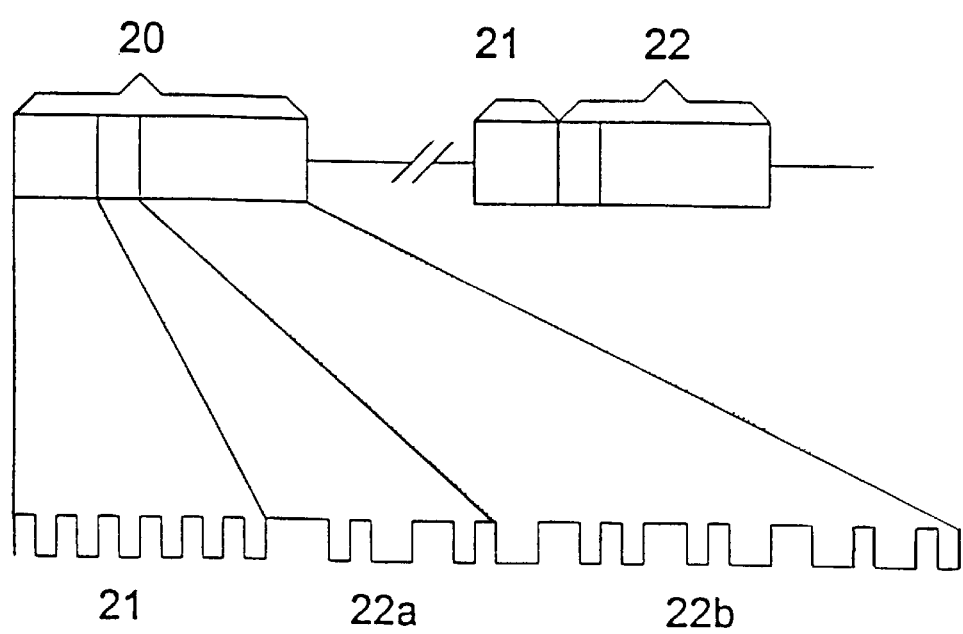
FIG. 2 shows coding of a transponder.

The transponder 5 emits continuously, or repeated within certain time intervals, a modulation code 20 shown in FIG. 2, which includes a phase and/or amplitude modulated reflex of a microwave signal radiated from the sensor 4, e.g., at 2.45 GHz.

The modulation of the transponder 5 is suitably made without adding new energy to the signal, in that the transponder from the output signal of the sensor 4, creates a modulated signal with information sidebands that are reradiated to the sensor and are there mixed down to base band, e.g.,—32 kHz, for further signal processing.

The sensor 4 can also, in a known way, by transmission of a pulse modulated microwave signal to the transponder 5 update its data contents.

In a special embodiment pulse modulation can also be used to activate the circuits in the transponder 5 that are causing the side band modulation, while the circuits revert to a resting state when the pulse modulation disappears. Since the transponder 5 only to a smaller part of its time is in the field of a sensor 4 the total current consumption will therefore be less than if the modulation takes place continuously.

In the embodiment every modulation code from the transponder is divided in a synchronizing/measurement sequence 21 and a data sequence 22.

During the synchronizing/measurement sequence 9, phase comparison is made in the 4 so that angular error signals can be created and brought forward for steering of the robot. 2 The measurement will be very accurate since the frequency and the phase of the transponder signal 21 during this time is controlled and unaffected by transponder data and therefore without uncontrolled spectrum widening. The signal is typically controlled from a crystal in the transponder unit, e.g. by a watch crystal with the frequency 32,768 Hz.

During the data sequence 22 data is transferred from the transponder 5 to the sensor 4 in the form of the signals 22a and 22b. In this case the sequence 21 is used for synchronizing of the decoding circuits in the robot 2 that are to interpret the signals 22a and 22b. The transferred signals 22a and 22b can be coded in a number of different ways, e.g according to FSK, DFSK, PSK or DPSK.

The signals 22a and 22b cause such a spectrum widening in the base band signal (e.g. around 32 kHz) that the precision of the measurement during the time of data sequence 22 will be considerably reduced. This is, however, not a problem, since the measuring sequence 21 is repeated often enough so that the robot 2 can not move very far between each measuring instant. A typical intermediate time between two measurement sequences can e.g. be 100 ms, while the measuring sequence in itself can be in the order of 10 ms.

When the robot 2 has now measured the position of the transponder 5 and has docked with the filling place 7 of the vehicle, a verification is needed that the identity of the driver correspondence with data from the transponder 5.

This takes place in the shown example in that the driver keys in a PIN code in the terminal 8 placed close to the side window. The higher level system has before that received information about which account is to be debited, and which PIN code that is connected with the account can alternatively be gathered from a data center that is called. Matching of the transponder code with the keyed in code leads to the fact that the robot 2 can start its fuelling pump and complete the fuelling. The matching takes place by means of circuits including a microprocessor or computer carried by the robot 2.

In another embodiment voice entering is used, whereby a microphone 11 is installed at the sensor unit 10, to which a voice recognition system is connected. The interpretation of this system of the announced code of the driver, e.g. a PIN code in the form of a number of spoken figures, is then matched with the transponder code.

Still another embodiment provide using identification with an optical sensor close to the vehicle that recognizes an object brought by the driver such as a card with a bar code or a dot code.

The sensor unit 4 can also be designed to receive signals from a code transmitter or an electronic data carrier that preferably operates in the visual, IR, radio or microwave range or alternatively operates with ultrasonic technology.

In the transponder 5 mounted on the vehicle also other information can also be stored, such as about discounts, fuel quality etc, which is especially advantageous if the filling station is remotely located and a non-called system therefore is used for the debiting.

In the same way it is of advantage if a prepaid value has been stored in the field of the transponder field 22b, which value is read by the sensor unit 4, is modified according to the cost for the performed filling and is rewritten in the data field 22b of the transponder.

The above mentioned method to encrypt the transponder information can thereby be used, and then the transponder unique code field signal 22a is used as a so called mark, while the code field signal 22b is used for data and possible random information.

The PIN code and/or a balance related to the payment is then preferably pre-programmed in the data field 22b of the transponder, whereby the data field of the transponder 5 is encrypted with information from a transponder unique and not changeable code in the transponder signal 22a, an encryption key and possibly a random number. This technology is more accurately described in connection with FIGS. 3 and 4, where the mark 22a corresponds to the field 47 and where the encrypted part of the data field 22b corresponds to the field 51.

Information to the driver is given on a display unit 9, e g instructions for the debiting and information about remaining amount in the transponder in case it is preprogrammed with money related information. The display unit 9 can also be used in conjunction with the transponder 5 being filled with a money related value via a bill reader, credit card, smart card or other technology.

The sensor unit 10 can thus include a keypad, microphone, video camera and image processing circuits, fingerprint detector, hand palm sensor, magnetic card reader, so called smart card reader, communication unit for code transmitter and data carrier etc.

Figure 3:
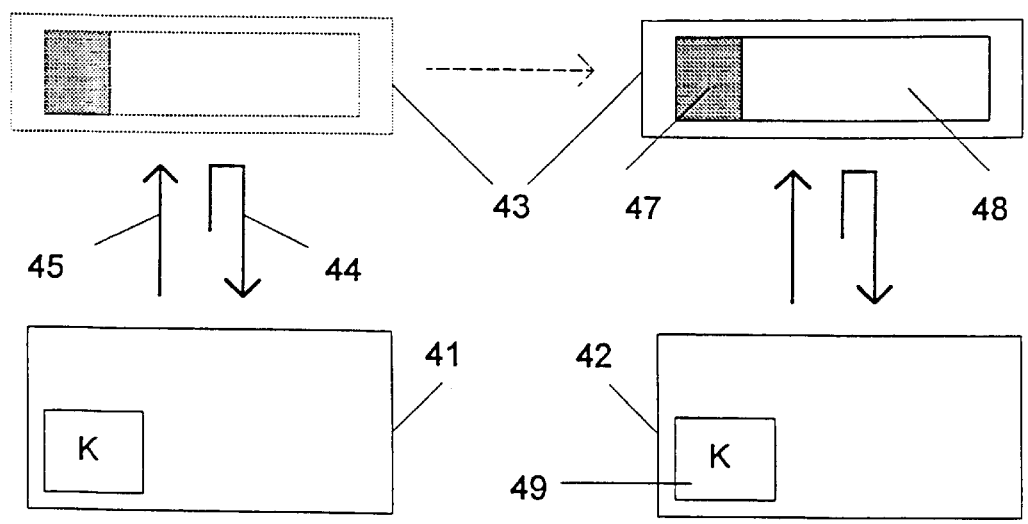
FIG. 3 shows one form of schematically encrypted writing and reading of a transponder.
Figure 4:
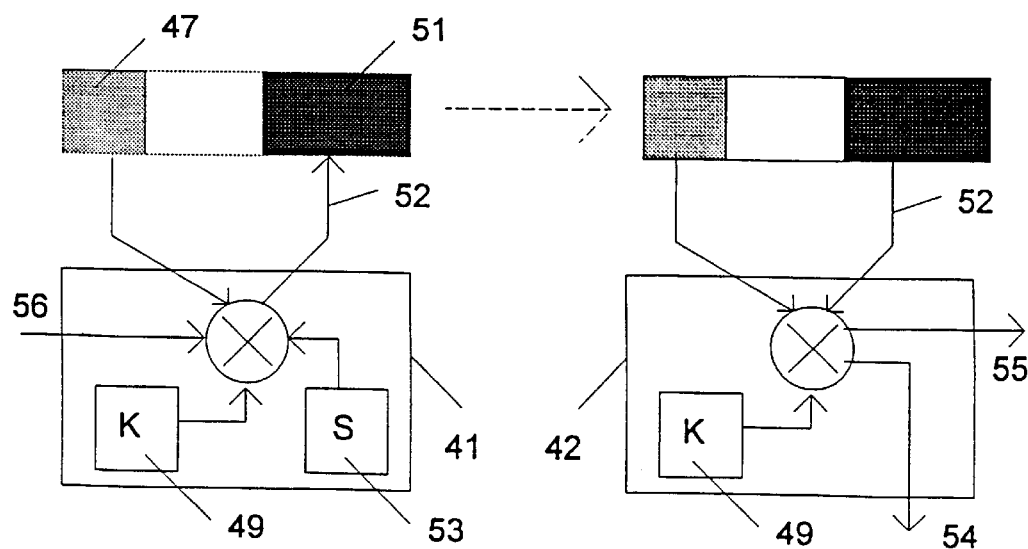
FIG. 4 shows the corresponding writing and reading in greater detail.

FIGS. 3 and 4 show writing and reading of an encrypted transponder 5 according to the invention, although the embodiment with hardware algorithm in the transponder is not shown in those figure.

In FIG. 3 two communication units 41, 42 and an associated transponder 43 are shown, where the first communication unit 9 is used for encrypted writing of data into the transponder 43 and the other is used for reading. The transponder 43 thus brings encrypted information from one place to another and thereby constitutes a media.

The transponder 43 is designed for communication by means of microwaves 44, 45, so that during writing it is illuminated with a coded microwave signal 45, and during reading it emits a reflex 44 where data, without new energy having been added to the microwave signal 44 is modulated onto an illumination signal 45 emitted from the communication unit 41, which during the modulation time is essentially continuous. The communication unit 41 can be a sensor 4 at a fuelling station with bill reader and/or credit card/smart card reader, and the communication unit 42 can be a sensor at a fuelling station which only is intended for filling of fuel and not for filling money-related amounts to the transponder 43.

The memory of the data carrier, I.E. the memory of the transponder 43, includes both a read only part 47 with a code unique for the data carrier, the so-called mark, and a read and write part 48, a so-called write/read memory, where variable data can be written. In the communication units 41, 42 there is also one and the same encryption key 49.

FIG. 4 shows an embodiment where at least a part 51 of the read/write memory 48 is readable from outside, and where the same data can be stored in different transponders despite that the bit pattern in the memory part 51 through said encryption is different from data carrier to data carrier. Encryption according to what is later mentioned about hardware key in the transponder can, but does not have to, be included in the transponder since all applications do not require this function.

The first communication unit 41 first reads the unique mark 47 and then encrypts the mark and the basic information 56 in the write/read memory part 51.

When the same system key 49 is used in the second communication unit 42, user data 56 can be recovered 55 in that the mark 47 then read from the transponder and the system key 49 are used for decryption of the encrypted information 52 that has been stored in the write/read memory 51 of the data carrier.

In addition to what has been described so far, one can, in addition to mark 47 and system key 49 also make use of a random number 53 created in the first communication unit 41 during encryption of the information 52 to the memory part 51 of the transponder. In this case the recovered user data 55 are separated from the recovered random number after decryption. Normally the random number 54 is thrown away after recovery.

Encrypted information in the memory part 51 of the transponder can thus concern validity-classed information intended to be varied only at certain communication instants, and then represents e.g. validity time, a PIN code, a geographical area or an authority class. It can also concern value-related information intended to be varied at each communication instant, such as monetary value to be used for fuelling.

The algorithm for writing of data in the transponder is normally of a symmetrical type, while an asymmetrical algorithm can be used for transferring of the system key in itself, possible PIN code, debiting data etc over the ordinary telecommunication network.

This transfer then takes place between different communication units, alternatively between a called date center and a communication unit.

Figure 5:
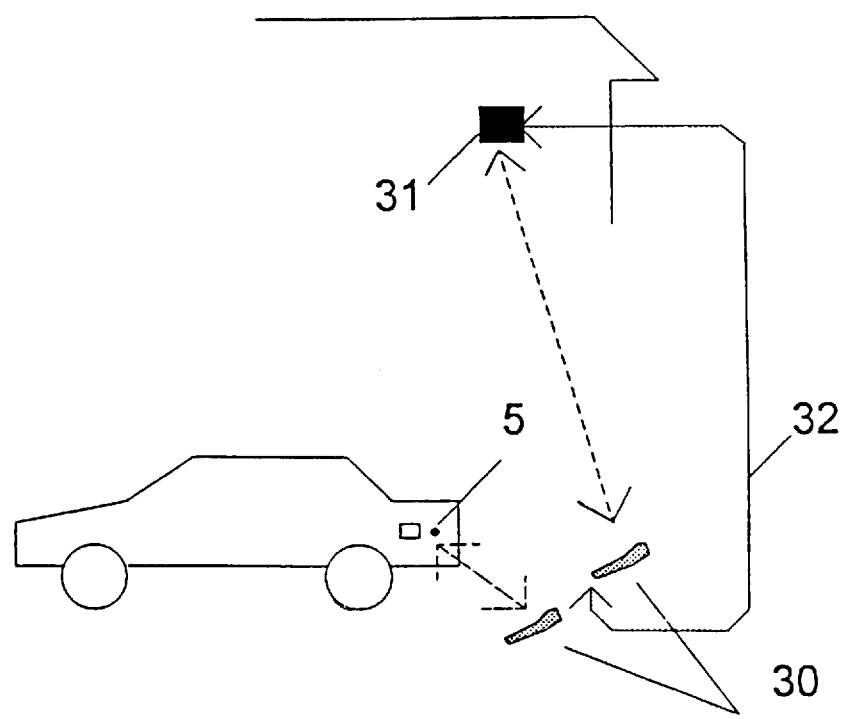
FIG. 5 is a dramatic view that shows communication between transponder and data center via a portable communication unit.

FIG. 5 shows a portable communication unit 30, which via microwaves at a relatively short distance can write and read information in the transponder 5 and at relatively large distance also can communicate this information with a data center 31. Because the communication unit 12 is designed fully transparent for data, as a result that the encryption key does not have to be in the portable unit 30 whereby the theft demand for it is reduced.

The communication unit 30 can also be connected to the data center via a serial line 32 instead of, or as a complement to, the earlier described microwave connection.

What is claimed is:

1. System for debiting for costs of automatic fuelling of vehicles, said system comprising: a transponder carried by a vehicle adjacent a fuel filling point of the vehicle for providing a position signal for positioning of a fuelling robot, a fuelling robot including a movable arm and a sensor for receiving the transponder position signal for positioning the robot arm relative to the fuel filling point of the vehicle, wherein the transponder contains coded information for use in debiting related to the filling, and wherein said coded information includes a code carried by the transponder and read by said sensor from the transponder and wherein said code is matched with verification data contained in a registration unit carried by the fuelling robot for identification of the driver of the vehicle and for enabling fuelling and debiting to be carried out when said coded information and said verification data correlate in a predetermined way.

2. System according to claim 1, wherein said driver identification is made by recognition of a driver PIN code.

3. System according to claim 2, wherein the sensor includes a keypad for entering of a PIN code.

4. System according to claim 1, wherein the registration unit includes an optical sensor responsive to a card carried by the driver and bearing a driver identification code.

5. System according to claim 1, wherein the registration unit includes a sensor for receiving and interpreting signals from a code transmitter carried by the driver, wherein the code transmitter provides coded visual signals.

6. System according to claim 1, wherein the transponder emits a synchronising/measuring sequence signal having a predetermined controlled frequency and phase for measurement of the position of the transponder relative to the fuelling robot, and wherein the transponder also emits a data sequence signal that includes account information for debiting an account for fuel delivered.

7. System according to claim 6, wherein the transponder includes a write/read memory and a payment authorization code that is stored in the write/read memory in the data sequence signal of the transponder, and wherein the transponder data sequence signal is encrypted with information from a unique and not changeable code carried by the transponder.

8. System according to claim 1, wherein the transponder includes a data field that contains information about an initial prepaid amount, and wherein after fuelling the vehicle the initial prepaid amount is modified by rewriting of a correspondingly changed remaining prepaid amount in the data field.

9. System according to claim 1, wherein the transponder is includes means for receiving a random number and a hardware algorithm for calculating a number and emitting information, and means for reading the emitted information and for confirming the information from the transponder independent of variation of the information from one instant to another.

10. System according to claim 1, including a portable communication unit for writing information to and reading information from the transponder, and wherein the portable communication unit communicates with the transponder and with a remote data center.

11. System according to claim 10, wherein the portable communication unit transfers encrypted information between the transponder and the remote data center independent of any encryption key in the portable communication unit.

12. System according to claim 1, wherein said driver identification is made by recognition of biometrical properties of the driver.

13. System according to claim 1, wherein said driver identification is made by recognition of an object carried by the driver.

14. System according to claim 2, wherein the sensor includes a microphone and voice recognition means for receiving and analyzing speech.

15. System according to claim 2, wherein the sensor includes a fingerprint detector.

16. System according to claim 2, wherein the sensor includes a hand palm sensor.

17. System according to claim 4, wherein the driver identification code is a bar code.

18. System according to claim 4, wherein the driver identification code is a dot code.

19. System according to claim 1, wherein the registration unit includes a sensor for receiving and interpreting signals from a code transmitter carried by the driver, wherein the code transmitter provides coded infrared signals.

20. System according to claim 1, wherein the registration unit includes a sensor for receiving and interpreting signals from a code transmitter carried by the driver, wherein the code transmitter provides coded radio signals.

21. System according to claim 20, wherein the radio signals are microwave signals.

22. System according to claim 1, wherein the registration unit includes a sensor for receiving and interpreting signals from a code transmitter carried by the driver, wherein the code transmitter provides coded ultrasonic signals.

23. System according to claim 6, wherein the transponder includes a write/read memory and a payment authorization code that is stored in the write/read memory in the data sequence signal of the transponder, and wherein the transponder data sequence signal is encrypted with information corresponding with an encryption key.

24. System according to claim 6, wherein the transponder includes a write/read memory and a payment authorization code that is stored in the write/read memory in the data sequence signal of the transponder, and wherein the transponder data sequence signal is encrypted with information from a unique and not changeable random number code carried by the transponder.

* * * * *